United States Patent [19]

Migdal

[11] Patent Number: 4,938,885

[45] Date of Patent: Jul. 3, 1990

[54] ANTIOXIDANT DISPERSANT POLYMER DENDRIMER

[75] Inventor: Cyril A. Migdal, Croton-on-Hudson, N.Y.

[73] Assignee: Texaco Inc., White Plains, N.Y.

[21] Appl. No.: 413,669

[22] Filed: Sep. 28, 1989

[51] Int. Cl.$^5$ ............................................. C10M 133/44
[52] U.S. Cl. ................................. 252/51.5 A; 252/401
[58] Field of Search ............................ 252/51.5 A, 401

[56] References Cited

U.S. PATENT DOCUMENTS

| | | | |
|---|---|---|---|
| 4,507,466 | 3/1985 | Tomalia et al. | 525/451 |
| 4,558,120 | 12/1985 | Tomalia et al. | 525/451 |
| 4,737,550 | 4/1988 | Tomalia | 525/418 |
| 4,857,599 | 8/1989 | Tomalia et al. | 525/418 |

Primary Examiner—Jacqueline V. Howard
Attorney, Agent, or Firm—Robert A. Kulason; James J. O'Loughlin; Vincent A. Mallare

[57] ABSTRACT

An antioxidant, dispersant lubricating composition comprises the product produced by first reacting an alkyl acrylate with an amine to produce an intermediate product, a first generation polyamine ester dendrimer which is then treated with an amine to produce a first generation polyamidoamine dendrimer which is then reacted with an acrylate to produce a second generation polyamidoamine ester dendrimer which with an amine is converted to a second generation polyamidoamine dendrimer which is then reacted with a polyisobutenyl succinic acid anhydride to produce the reactant product a polyisobutenyl succinimide-polyamidoamine dendrimer polymer.

12 Claims, No Drawings

ANTIOXIDANT DISPERSANT POLYMER DENDRIMER

BACKGROUND OF THE INVENTION

This invention relates to polymer dendrimers and more particularly to polymer dendrimers which impart both antioxidant and dispersant properties to a lubricant.

The basis for the present new development is in the preparation of polymer dendrimers which are known as "Starburst" dendrimers.

At Dow Chemical, Donald A. Tomalia has been developing families of compounds that he calls "starburst dendrimers". The word dendrimer derives from dendron, the Greek word for tree. At the University of South Florida, George R. Newkome has been developing other families of multibranched molecules that he has named "arborols"—from arbor, the Latin word for tree. Both chemists expect their new macromolecules to be useful for many purposes.

Explaining his work on starburst dendrimers, Tomalia notes that they have three distinguishing structural features; an initiator core, interior layers of repeating units radially attached to the core, and an outer surface of terminal functionality.

Dendrimer synthesis is a stepwise process. Any of several systems can be used to start and build up these "precision macromolecules". The polyamidoamines (PAMAMs) are probably furthest along in development. Their synthesis typifies the general approach.

In the first step of PAMAM synthesis, an initiator core such as ammonia or ethylenediamine (EDA) is reacted with methyl acrylate—the so-called Michael addition—to form a triester. In the second step, the triester is exhaustively amidated with a large excess of EDA to form a triamidoamine. Tomalia refers to this first-generation compound as a starbranch oligomer.

The stepwise procedure is repeated to form succeeding generations of starburst dendrimers, each with twice as many terminal groups as its predecessor. If ammonia is used as the initiator core, the progression is 3, 6, 12, and so on, up to 1536 for the 10th generation. With increasing size, the molecules tend to assume a spheroidal shape. In contrast, if EDA is used as the initiator core, the progression is 4, 8, 16, and so on. These molecules tend to become ellipsoidal.

Thus, in the present invention, it is an object to utilize this basic teaching of dendrimers to develop a useful anti-oxidant dispersant polymer dendrimer that imparts these properties to a lubricant.

DISCLOSURE STATEMENT

U.S. Pat. No. 4,507,466 discloses a dense star polymer having at least one branch emanating from a core, said branch having at least one terminal group provided that (1) the ratio of terminal groups to the core branches is two or greater, (2) the density of terminal groups per unit volume in the polymer is at least 1.5 times that of a conventional star polymer having a comparable molecular weight and number of core branches, each of such branches of the conventional star polymer bearing only one terminal group, and (3) a molecular volume that is equal to or less than about 60 percent of the molecules volume of said conventional star polymer as determined by dimensional studies using scaled Corey-Pauling molecular models.

U.S. Pat. No. 4,558,120 discloses star polymers having terminal group densities greater than conventional star polymers exhibit greater and more uniform reactivity than their corresponding conventional star polymers. For example, a third generation, amine-terminated polyamidoamine dense star polymer prepared from ammonia, methyl acrylate and ethylenediamine has $1.24 \times 10^{-4}$ amine moieties per unit volume (cubic Angstrom units) in contrast to the $1.58 \times 10^{-6}$ amine moities per unit volume contained by a conventional star polymer. Such dense star polymers are useful as demulsifiers for oil/water emulsions, wet strength agents in the manufacture of paper, and agents for modifying viscosity in aqueous formulations such as paints.

*Chemical and Engineering New (C&EN)*, Feb. 22, 1988, (pp. 19-21) article discloses work and development of "starburst" dendrimers at Dow Chemical and leading universities; NEW FAMILIES OF MULTIBRANCHED MACROMOLECULES SYNTHESIZED.

SUMMARY OF THE INVENTION

This invention provides a lubricating composition which comprises a major portion of lubricating oil and a minor, effective dispersant, amount of a reaction product which is prepared by a process comprising:

(a) reacting an amine with an alkyl acrylate in the presence of an alkyl alcohol to produce a first generation polyamine ester dendrimer;

(b) reacting said first generation polyamine ester dendrimer with an amine or a polyamine to produce a first generation polyamidoamine dendrimer;

(c) reacting said first generation polyamidoamine dendrimer with an alkyl acrylate to produce a 12-branch second generation polyamidoamine ester dendrimer;

(d) reacting said second generation polyamidoamine ester dendrimer with an amine or polyamine to produce a 12-branch second generation polyamidoamine dendrimer; and (e) reacting said 12-branch second generation polyamidoamine dendrimer with a polyisobutenyl succinic acid anhydride to produce the product lubricant, a 12-polyisobutenyl succinimide-12-polyamidoamine dendrimer polymer.

DETAILED DESCRIPTION OF THE INVENTION

The "STARBURST" (Trademark of Dow Chemical Company) dendrimers that are at the core of the dispersants of the present invention are known, however, none have been reacted with alkenyl succinic acid anhydrides as described in this invention and demonstrated to have dispersancy powers in lubricating oils. Other star-shaped dispersants have relied on cores of hydrogenated homopolymers and copolymers of conjugated dienes, usually prepared via a "living" polymerization reaction. These have the hydrophobic portion in the core and the hydrophilic portion the surface. The present invention is of the reverse configuration.

The dendrimer dispersants of the present invention are unique in the sense that they exhibit antioxidant activity, although no known antioxidant functionality was incorporated into the dispersant. Therefore, quite unexpectedly these dendrimer dispersant are multifunctional and should be described as antioxidant dispersants. The dendrimer dispersants of the present invention are less sensitive to degradation by shearing than conventional polymeric dispersants which is a useful property of lubricating oils.

product lubricants of this invention, are illustrated step-by-step in the following formula reaction diagrams.

FORMULA REACTION DIAGRAMS

First Step

N(CH$_2$CH$_2$NH$_2$)$_3$ + CH$_2$=CHCOOCH$_3$ ⟶ N(CH$_2$CH$_2$N(CH$_2$CH$_2$COOCH$_3$)$_2$)$_3$
                       (MA)                                (I)

Second Step

I + NH$_2$CH$_2$CH$_2$NH$_2$ ⟶ N(CH$_2$CH$_2$N(CH$_2$CH$_2$CONHCH$_2$CH$_2$NH$_2$)$_2$)$_3$
   (EDA)                                  (IA)

Third Step
Choice 1

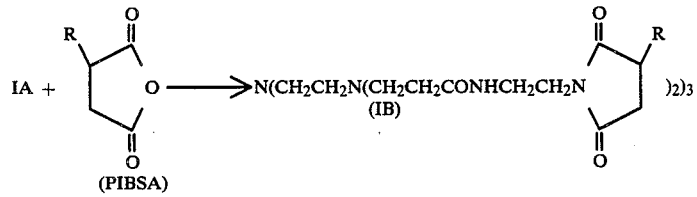

Choice 2

IA + MA ⟶ N(CH$_2$CH$_2$N(CH$_2$CH$_2$CONHCH$_2$CH$_2$N(CH$_2$CH$_2$COOCH$_3$)$_2$)$_2$)$_3$
                                         (II)

Fourth Step

II + EDA ⟶ N(CH$_2$CH$_2$N(CH$_2$CH$_2$CONHCH$_2$CH$_2$N(CH$_2$CH$_2$CONHCH$_2$CH$_2$NH$_2$)$_2$)$_2$)$_3$
                             (IIA)

Fifth Step
Choice 1

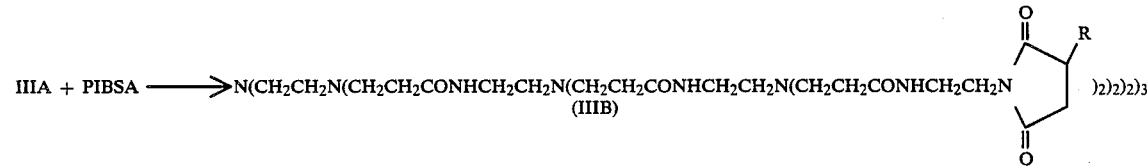

IIA + PIBSA ⟶ N(CH$_2$CH$_2$N(CH$_2$CH$_2$CONHCH$_2$CH$_2$N(CH$_2$CH$_2$CONHCH$_2$CH$_2$N ...)$_2$)$_2$)$_3$
(IIB)

Choice 2

IIA + MA ⟶ N(CH$_2$CH$_2$N(CH$_2$CH$_2$CONHCH$_2$CH$_2$N(CH$_2$CH$_2$CONHCH$_2$CH$_2$N(CH$_2$CH$_2$COOCH$_3$)$_2$)$_2$)$_2$)$_3$
                                        (III)

Sixth Step

III + EDA ⟶ N(CH$_2$CH$_2$N(CH$_2$CH$_2$CONHCH$_2$CH$_2$N(CH$_2$CH$_2$CONHCH$_2$CH$_2$N(CH$_2$CH$_2$CONHCH$_2$CH$_2$NH$_2$)$_2$)$_2$)$_2$)$_3$
                                         (IIIA)

Seventh Step
Choice 1

IIIA + PIBSA ⟶ N(CH$_2$CH$_2$N(CH$_2$CH$_2$CONHCH$_2$CH$_2$N(CH$_2$CH$_2$CONHCH$_2$CH$_2$N(CH$_2$CH$_2$CONHCH$_2$CH$_2$N ...)$_2$)$_2$)$_2$)$_3$
(IIIB)

Choice 2

IIIA + MA ⟶

N(CH$_2$CH$_2$N(CH$_2$CH$_2$CONHCH$_2$CH$_2$N(CH$_2$CH$_2$CONHCH$_2$CH$_2$N(CH$_2$CH$_2$CONHCH$_2$CH$_2$N(CH$_2$CH$_2$COOCH$_3$)$_2$)$_2$)$_2$)$_2$)$_3$
(IV)
ETC.

R = Polyisobutenyl group

The processes for making the present dendrimers useful as antioxidant/dispersant polymer dendrimer product lubricants of this invention, are illustrated step-by-step in the following formula reaction diagrams.

As illustrated above:

In the first step tris(2-aminoethyl)amine is reacted with methyl acrylate (MA) to provide the "First Generation Polyamine Ester Dendrimer" (I);

In the second step: the ester dendrimer (I) is reacted with ethyline diamine (EDA) in methyl alcohol to provide the "First Generation Polyamidoamine Dendrimer" (IA);

In the third step, a choice may be made to treat the Polyamidoamine Dendrimer (IA) with polyisobutenyl succinic acid anhydride (PIBSA) to provide the product, 6-polyisobutenyl succinimide-6-polyamidoamine dendrimer polymer (IB) which is an antioxidant (AO)/dispersant (DISP);

Or in the third step, a second choice may be made to react the Polyamidoamine Dendrimer (IA) with methyl acrylate (MA) to provide a "Second Generation Polyamidoamine Ester Dendrimer Polymer" (II);

If the second choice in the third step is practiced, a fourth step follows: The ester dendrimer (II) is reacted with ethylene diamine (EDA) in the presence of methyl alcohol to provide the "Second Generation Polyamidoamine Dendrimer Polymer" (IIA);

In the fifth step a choice may be made to treat the Polyamidoamine Dendrimer (IIA) with polyisobutenyl succinic acid anhydride (PIBSA) to provide the product, 12-polyisobutenyl succinimide-12-polyamidoamine dendrimer polymer (IIB) which is an antioxidant (AO)/dispersant (DISP);

Or in the fifth step, a second choice may be made to react the Polyamidoamine Dendrimer (IIA) with methyl acrylate (MA) to provide a "Third Generation Polyamidoamine Ester Dendrimer Polymer" (III);

If the second choice in the fifth step is practiced, a sixth step follows: The ester dendrimer (III) is reacted with ethylene diamine (EDA) in methyl alcohol to provide the "Third Generation Polyamidoamine Dendrimer Polymer" (IIIA);

In the seventh step a choice may be made to treat the Polyamidoamine Dendrimer (IIIA) with polyisobutenyl succinic acid anhydride (PIBSA) to provide the product, 24-polyisobutenyl succinimide-24-polyamidoamine dendrimer polymer (IIIB) which is an antioxidant (AO)/dispersant (DISP);

Or in the seventh step, a second choice may be made to react the Polyamidoamine Dendrimer (IIIA) with methyl acrylate (MA) to provide a "Fourth Generation Polyamidoamine Ester Dendrimer Polymer (IV)"; thus, the cycle can be continued in the manner described above.

In the process for making the present dendrimers, the alkyl group may contain from 1 to 8 carbon atoms and include methyl, ethyl, butyl, propyl, hexyl and the like.

As for the alkyl acrylate it may contain from 1 to 6 carbon atoms and include methyl acrylate, ethyl acrylate, butyl acrylate and the like.

The polyisobutenyl succinic acid anbrydride which is important in the process described above, may have a molecular weight (Mn) ranging from about 500 to about 5,000.

And, in the process, the amine used may be selected from the group consisting of ethylene diamine (EDA), $NH_3$, diethylene-triamine (DETA), tetraethylene-triamine (TETA) tetraethylene-pentamine (TEPA), pentaethylene-hexamine (PEHA), ethyeneamine and a polyamine.

The antioxidant/dispersant produced according to the present invention is:

m-polyisobutenyl-succinimide - n-polyamindoamine dendrimer polymer, where m=1-1024 and n=4-1024. Thus, many dendrimer polymers can be produced according to the present invention including:

6-polyisobutenylsuccinimide-6-polyamidoamine dendrimer polymer;

7.2-polyisobutenylsuccinimide-8-polyamidoamine dendrimer polymer;

12-polyisobutinylsuccununide-12-polyamidoamine dendrimer polymer; and 24-polyisobutenylsuccinimide-24-polyamidoamine dendrimer polymer;

The products produced according to the present invention, i.e., the dendrimer polymers, may be borated or otherwise treated to produce respectively, borated and acylated derivatives thereof.

That is, the dendrimer polymers may be borated with a borating agent selected from the group consisting of boric acid, boron oxide, a boron halide and a boron acid ester, to provide borated derivatives thereof.

And, the dendrimer polymers may be treated with a reagent selected from the group consisting glycolic acid, oxalic acid, formic acid, and a ($C_1$-$C_2$) alkyl ester of the foregoing acids, to provide acylated derivatives thereof.

The present invention and its advantages will be more clear and apparent when considering the following Examples.

EXAMPLE 1

Preparation of First Generation Polyamine Ester Dendrimer

Methyl acrylate (284 g, 3.29 moles) was added to a two-liter, 3-neck flask equipped with mechanical stirrer, condenser, thermometer, and thermocouple. An addition funnel was charged with methanol (1 liter) and tris-(2-aminoethyl)amine (73 g, 0.50 moles). The contents of the addition funnel were added dropwise with stirring over 6 hours. The mixture was allowed to stand at room temperature for 48 hours at which point excess methyl acrylate and methanol were removed by vacuum distillation (4 mm Hg at 50° C.). This yielded 330 g for a 99% yield. The product was identified by IR and $^1H$ and $^{13}C$ NMR.

EXAMPLE 2

Preparation of First Generation Polyamidoamine Dendrimer

Ethylenediamine (300 g, 5.0 moles) was dissolved in methanol (300 mL) in a two-liter reaction flask equipped with mechanical stirrer, condenser, thermometer, and thermocouple. An addition funnel was charged with methanol (300 mL) and aforementioned first generation polyester dendrimer (300 g, 0.45 moles). The contents of the addition funnel were added dropwise with stirring over 4 hours. The mixture was allowed to stand at room temperature for 48 hours, at which point excess ethylenediamine and methanol were removed by vacuum distillation (4 mm Hg at 70° C.). This gave 362 g for a 96% yield. The product was characterized by IR, $^1H$ NMR and $^{13}C$ NMR.

EXAMPLE 3

Preparation of Second Generation Polyamidoamine Ester Dendrimer

Methyl acrylate (516 g, 6.00 moles) was added to a 3-liter, 3-neck flask equipped with mechanical stirrer, condenser, thermometer, and thermocouple. An addition funnel was charged with methanol (700 mL) and the aforementioned first generation polyamine dendrimer (325.9 g, 0.39 moles). The contents of the addition funnel were added dropwise with stirring over 4 hours. The mixture was allowed to stand at room temperature for 48 hours at which point excess methyl acrylate and methanol were removed by vacuum distillation (4 mm Hg at 50° C.). This yielded 718 g for a 98.3% yield. The product was identified by IR and $^1$H and $^{13}$C NMR.

EXAMPLE 4

Preparation of Second Generation Polyamidoamine Dendrimer

Ethylenediamine (1.5 Kg, 25.0 moles) was dissolved in methanol (1 liter) in a 5-liter, 3-neck flask equipped with mechanical stirrer, condenser, thermometer, and thermocouple. An addition funnel was charged with methanol (600 mL) and aforementioned second generation polyester dendrimer (355.6 g, 0.19 moles). The contents of the addition funnel were added dropwise with stirring over 4 hours. The mixture was allowed to stand at room temperature for 78 hours at which point excess ethylenediamine and methanol were removed by vacuum distillation (1 mm Hg at 50° C.). This gave 405.4 g for a 96% yield. The product was characterized by IR, $^1$H NMR and $^{13}$C NMR.

EXAMPLE 5

Preparation of a Polybutenylsuccinimide Dispersant of a Second Generation Polyamidoamine Dendrimer A solution of polyisobutenylsuccinic acid anhydride (380 g, 0.1089 moles, PIBSA prepared from an approximately 2060 mol. wt. polyisobutene) in diluent oil (293 g) was charged into a two-liter 3-neck flask equipped with a mechanical stirrer, thermometer, thermocouple, and nitrogen inlet and heated to 60° C. Next the dendrimer (20 g, 0.0091 moles) from Example 4 was added and the heat was increased to 120° C. and maintained for 2.5 hours. Then further increased to 150° C. and maintained for 1 hour to drive off water. The hot mixture (~100° C.) was filtered through diatomaceous earth filter aid. The product (an approximately 50% concentrate) analyzed as follows: % N=0.60 (0.63 calc.), Total Acid Number (TAN)=0.73, and Total Base Number (TBN)=8.62.

EXAMPLE 6

Preparation of First Generation Polyamine Ester Dendrimer

Methyl acrylate (391.0 g, 4.54 moles) was added to a two-liter, 3-neck flask equipped with mechanical stirrer, condenser, thermometer, and thermocouple. An addition funnel was charged with methanol (500 mL) and 1,6-hexanediamine (60.2 g, 0.52 moles). The contents of the addition funnel were added dropwise with stirring over 6 hours. The mixture was allowed to stand at room temperature for 48 hours at which point excess methyl acrylate and methanol were removed by vacuum distillation (1 mm Hg at 29° C.). This yielded 231.7 for a 97% yield. The product was identified by IR and $^1$H and $^{13}$C NMR.

EXAMPLE 7

Preparation of First Generation Polyamidoamine Dendrimer

Ethylenediamine (1 Kg, 16.6 moles) was dissolved in methanol (1 liter) in a 5-liter reaction flask equipped with mechanical stirrer, condenser, thermometer, and thermocouple. An addition funnel was charged with methanol (500 mL) and aforementioned first generation polyester dendrimer (200 g, 0.43 moles). The contents of the addition funnel were added dropwise with stirring over 4 hours. The mixture was allowed to stand at room temperature for 48 hours, at which point excess ethylenediamine and methanol were removed by vacuum distillation (0.5 mm Hg at 50° C.). This gave 240 g for a 97% yield. The product was characterized by IR, $^1$H and $^{13}$C NMR.

EXAMPLE 8

Preparation of Second Generation Polyamidoamine Ester Dendrimer

Methyl acrylate (600 g, 6.9 moles) was added to a 3-liter, 3-neck flask equipped with mechanical stirrer, condenser, thermometer, and thermocouple. An addition funnel was charged with methanol (700 mL) and the aforementioned first generation polyamine dendrimer (200.0 g, 0.35 moles). The contents of the addition funnel were added dropwise with stirring over 4 hours. The mixture was allowed to stand at room temperature for 48 hours at which point excess methyl acrylate and methanol were removed by vacuum distillation (1 mm Hg at 50° C.). This yielded 424 g for a 96.1% yield. The product was identified by IR and $^1$H and $^{13}$C NMR.

EXAMPLE 9

Preparation of Second Generation Polyamidoamine Dendrimer

Ethylenediamine (900 g, 14.0 moles) was dissolved in methanol (500 mL) in a 3-liter, 3-neck flask equipped with mechanical stirrer, condenser, thermometer, and thermocouple. An addition funnel was charged with methanol (500 mL) and aforementioned second generation polyester dendrimer (225.0 g, 0.18 moles). The contents of the addition funnel were added dropwise with stirring over 4 hours. The mixture was allowed to stand at room temperature for 78 hours at which point excess ethylenediamine and methanol were removed by vacuum distillation (0.5 mm Hg at 30° C.). This gave 252 g for a 94.7% yield. The product was characterized by IR, $^1$H and $^{13}$C NMR.

EXAMPLE 10

Preparation of a Polybutenylsuccinimide Dispersant of a Second Generation Polyamidoamine Dendrimer Polyisobutenylsuccinic acid anhydride (789.4 g, 0.242 moles, PIBSA prepared from an approximately 2060 mol. wt. polyisobutene) was charged into a two-liter 3-neck flask equipped with a mechanical stirrer, thermometer, thermocouple, and nitrogen inlet. Next 100 P Pale oil (756 g) was added and the mixture heated to 60° C. Next the dendrimer (50 g, 0.0336 moles) from Example 9 was added and the heat was increased to 120° C.

and maintained for 2.0 hours. Then further increased to 150° C. and maintained for 4 hour to drive off water. The hot mixture (~100° C.) was filtered through diatomaceous earth filter aid. The product (an approximately 50% concentrate) analyzed as follows: % N=0.82 (0.83 calc.), Total Acid Number (TAN)=0.93, and Total Base Number (TBN)=10.19.

EXAMPLE 11

Preparation of Third Generation Polyamidoamine Ester Dendrimer

Methyl acrylate (1720 g, 20.0 moles) was added to a 5-liter, 3-neck flask equipped with mechanical stirrer, condenser, thermometer, and thermocouple. An addition funnel was charged with methanol (500 mL) and the aforementioned second generation polyamidoamine dendrimer (200.0 g, 0.091 moles) from Example 4. The contents of the addition funnel were added dropwise with stirring over 4 hours. The mixture was allowed to stand at room temperature for 48 hours at which point excess methyl acrylate and methanol were removed by vacuum distillation (1 mm Hg at 50° C.). The product was identified by IR and $^1$H and $^{13}$C NMR.

EXAMPLE 12

Preparation of Third Generation Polyamidoamine Dendrimer

Ethylenediamine (1500 g, 25.0 moles) was dissolved in methanol (1 liter) in a 5-liter, 3-neck flask equipped with mechanical stirrer, condenser, thermometer, and thermocouple. An addition funnel was charged with methanol (500 mL) and the aforementioned third generation polyamidoamine ester dendrimer (250.0 g, 0.059 moles). The contents of the addition funnel were added dropwise with stirring over 4 hours. The mixture was allowed to stand at room temperature for 72 hours at which point excess ethylenediamine and methanol were removed by vacuum distillation (0.5 mm Hg at 30° C.). The product was characterized by IR, $^1$H and $^{13}$C NMR.

EXAMPLE 13

Preparation of a Polybutenylsuccinimide Dispersant of a Third Generation Polyamidoamine Dendrimer Polyisobutenylsuccinic acid anhydride (3427.2 g, 0.84 moles, PIBSA prepared from an approximately 2300 mol. wt. polyisobutene) was charged into a 12-liter 3-neck flask equipped with a mechanical stirrer, thermometer, thermocouple, and nitrogen inlet. Next 100 P Pale oil (2884.7 g) was added and the mixture heated to 60° C. Next the dendrimer (250 g, 0.0586 moles) from Example 12 was added and the heat was increased to 120° C. and maintained for 2.0 hours. Then further increased to 150° C. and maintained for 4 hour to drive off water. The hot mixture (~100° C.) was filtered through diatomaceous earth filter aid. The product (an approximately 50% concentrate) analyzed as follows: % N=0.80 (0.70 calc.), Total Acid Number (TAN)=0.63, and Total Base Number (TBN)=10.34.

EXAMPLE 14

Preparation of a Borated Polybutenylsuccinimide Dispersant of a Third Generation Polyamidoamine Dendrimer Polyisobutenylsuccinimide dispersant from Example 13 above (3500.0 g, 0.028 moles) was charged into a 5-liter 3-neck flask equipped with a mechanical stirrer, thermometer, thermocouple, and nitrogen inlet, and heated to 60° C. Next boric acid (4.0 g, 0.064 moles) was added, the heat was increased to 120° C. and maintained for 0.5 hours. Then further increased to 160° C. and maintained for 4 hour to drive off water. The hot mixture (~100° C.) was filtered through diatomaceous earth filter aid. The product (an approximately 50% concentrate) analyzed as follows: % N=0.80 (0.70 calc.), % B=0.01 (0.02 calc.), Total Acid Number (TAN)=0.56, and Total Base Number (TBN)=7.71.

EXAMPLE 15

Preparation of a Polybutenylsuccinimide Dispersant of a Second Generation Polyamidoamine Dendrimer Polyisobutenylsuccinic acid anhydride (6743.0 g, 1.092 moles, PIBSA prepared from an approximately 2060 mol. wt. polyisobutene, diluted 1.3:1 in 100 P Pale oil) was charged into a 12-liter 3-neck flask equipped with a mechanical stirrer, thermometer, thermocouple, and nitrogen inlet. Next 100 P Pale oil (1060.0 g) was added and the mixture heated to 60° C. Next the dendrimer (200 g, 0.091 moles) from Example 4 was added and the heat was increased to 120° C. and maintained for 2.5 hours. The hot mixture (~100° C.) was filtered through diatomaceous earth filter aid. The product (an approximately 50% concentrate) analyzed as follows: % N=0.60 (0.63 calc.), Total Acid Number (TAN)=0.73, and Total Base Number (TBN)=8.62.

EXAMPLE 16

Preparation of a Polybutenylsuccinimide Dispersant of a Second Generation Polyamidoamine Dendrimer Polyisobutenylsuccinic acid anhydride (3197.0 g, 0.980 moles, PIBSA prepared from an approximately 2060 mol. wt. polyisobutene) was charged into a 12-liter 3-neck flask equipped with a mechanical stirrer, thermometer, thermocouple, and nitrogen inlet. Next 100 P Pale oil (2740 g) was added and the mixture heated to 60° C. Next the dendrimer (200 g, 0.091 moles) from Example 4 was added and the heat was increased to 120° C. and maintained for 2.0 hours. Then further increased to 160° C. and maintained for 4 hour to drive off water. The hot mixture (~100° C.) was filtered through diatomaceous earth filter aid. The product (an approximately 50% concentrate) analyzed as follows: % N=0.82 (0.83 calc.), Total Acid Number (TAN)=0.76, and Total Base Number (TBN)=9.53.

EXAMPLE 17

Preparation of a Polybutenylsuccinimide Dispersant of a Third Generation Polyamidoamine Dendrimer Polyisobutenylsuccinic acid anhydride (554.5 g, 0.170 moles, PIBSA prepared from an approximately 2060 mol. wt. polyisobutene) was charged into a 2-liter 3-neck flask equipped with a mechanical stirrer, thermometer, thermocouple, and nitrogen inlet. Next 100 P Pale oil (475.1 g) was added and the mixture heated to 60° C. Next the dendrimer (35 g, 0.007 moles) from Example 12 was added and the heat was increased to 120° C. and maintained for 2.0 hours. Then further increased to 160° C. and maintained for 2 hour to drive off water. The hot mixture (~100° C.) was filtered through diatomaceous earth filter aid. The product (an approximately 50% concentrate) analyzed as follows: % N=0.67 (0.66 calc.), Total Acid Number (TAN)=1.07, and Total Base Number (TBN)=9.38.

EXAMPLE 18

Preparation of a Polybutenylsuccinimide Dispersant of a Third Generation Polyamidoamine Dendrimer Polyisobutenylsuccinic acid anhydride (447.2 g, 0.340 moles, PIBSA prepared from an approximately 920 mol. wt. polyisobutene) was charged into a 2-liter 3-neck flask equipped with a mechanical stirrer, thermometer, thermocouple, and nitrogen inlet. Next 100 P Pale oil (421.6 g) was added and the mixture heated to 60° C. Next the dendrimer (70.0 g, 0.014 moles) from Example 12 was added and the heat was increased to 120° C. and maintained for 2.0 hours. Then further increased to 160° C. and maintained for 2 hour to drive off water. The hot mixture (~100° C.) was filtered through diatomaceous earth filter aid. The product (an approximately 50% concentrate) analyzed as follows: % N=1.82 (2.55 calc.), Total Acid Number (TAN)=0.23, and Total Base Number (TBN)=21.26.

EXAMPLE 19

Preparation of a Polybutenylsuccinimide Dispersant of a Third Generation Polyamidoamine Dendrimer Polyisobutenylsuccinic acid anhydride (414.3 g, 0.170 moles, PIBSA prepared from an approximately 1290 mol. wt. polyisobutene) was charged into a 2-liter 3-neck flask equipped with a mechanical stirrer, thermometer, thermocouple, and nitrogen inlet. Next 100 P Pale oil (363.2 g) was added and the mixture heated to 60° C. Next the dendrimer (35 g, 0.007 moles) from Example 12 was added and the heat was increased to 120° C. and maintained for 2.0 hours. Then further increased to 160° C. and maintained for 2 hour to drive off water. The hot mixture (~100° C.) was filtered through diatomaceous earth filter aid. The product (an approximately 50% concentrate) analyzed as follows: % N=0.89 (1.47 calc.), Total Acid Number (TAN)=0.10, and Total Base Number (TBN)=14.44.

EXAMPLE 20

Preparation of a Glycolamide Polybutenylsuccinimide Dispersant of a Third Generation Polyamidoamine Dendrimer Polyisobutenylsuccinimide dispersant from Example 13 above (500.0 g, 0.004 moles) was charged into a 1-liter 3-neck flask equipped with a mechanical stirrer, thermometer, thermocouple, and nitrogen inlet, and heated to 60° C. Next glycolic acid (1.0 g, 0.01 moles, 70% solution) was added, the heat was increased to 120° C. and maintained for 0.5 hours. Then further increased to 160° C. and maintained for 2 hour to drive off water. The hot mixture (~100° C.) was filtered through diatomaceous earth filter aid. The product (an approximately 50% concentrate) analyzed as follows: % N=0.63 (0.70 calc.), Total Acid Number (TAN)=0.10, and Total Base Number (TBN)=9.19.

The products of the above Examples were evaluated by the Bench Oxidation Test (BOT) described below.

THE BENCH OXIDATION TEST (BOT)

The Bench Oxidation Test (BOT) was used to determine if the dendrimer dispersant would have anti-oxidant (AO) properties. In this test, the oil composition is heated to 175° C. under a blanket of nitrogen. A sample is taken to establish a base line. The oil is maintained at 175° C. while a stream of air is passed through it at the rate of 500 mL/minute for six hours. Samples are taken every hour and the DIR of each sample is determined against the base line 1712 cm-1. The DIR is used as a measure of oxidation. In these tests, the oil employed was a solvent neutral oil having an SUS viscosity at 100° F. of 130. In the tested oils, the additive was employed at nitrogen concentration of 0.1 weight percent. The results of the examples provided below in Table I illustrate the surprising effectiveness of the novel lubricant additive when employed in a lubricating oil composition.

TABLE I

Results of Bench Oxidation Test (BOT) ANTIOXIDANT/DISPERSANT

| EXAMPLE | % Nitrogen | (BOT) Results* |
|---|---|---|
| 9 | 0.10 | 2.9 |
| 16 | 0.10 | 4.9 |
| 17 | 0.10 | 4.2 |
| SG Dispersant | 0.10 | 20.7 |

*The higher the number above 7 the more pro-oxidant character. The lower the number below 7 the more anti-oxidant character.

The diesel engine (MWM-B) test results are provided below in Table II, in which a MWM-B diesel engine was used.

TABLE II

Engine Test Results
Diesel Engine Test Results

| EXAMPLE | ENGINE (Diesel) | RESULT |
|---|---|---|
| 14 | MWM-B | 66 merits |
| 15 | MWM-B | 55 merits |
| 16 | MWM-B | 63 merits |
| SG Dispersant | MWM-B | 65 merits |

The Sequence VE results of a gasoline engine (i.e., a Ford 1.8 liter and 4-cylinder engine) are provided below in Table III.

TABLE III

| PRODUCT TESTED | AS** | AV** | PVS** | % ORC* | % OSC** |
|---|---|---|---|---|---|
| SG Dispersant* | 6.5 | 4.2 | 6.9 | 46.0 | 44.0 |
| Example 15 (AO/DISP)* | 8.7 | 3.7 | 7.2 | 18.0 | 10.0 |

*(AO/DISP) and SG Dispersant are 6.5% in a SAE 30W Formulation
**AS, AV, PSV, ORC, and OSC denote: Average sludge, average varnish, piston skirt varnish, oil ring clogging, and oil screen clogging, respectively.

I claim:

1. A lubricating composition comprising a major portion of a lubricating oil and a minor, effective dispersant, amount of a reaction product by a process comprising the following steps which can be repeated any desired number of times, said process comprising:
    (a) reacting an amine or polyamine with an alkyl acrylate in the presence of an alkyl alcohol to produce a first generation polyamine ester dendrimer;
    (b) reacting said first generation polyamine ester dendrimer with an amine or a polyamine to produce a first generation polyamidoamine dendrimer;
    (c) reacting said first generation polyamidoamine dendrimer with an alkyl acrylate to produce a 12-branch second generation polyamidoamine ester dendrimer;
    (d) reacting said 12-branch second generation polyamidoamine ester dendrimer with an amine or polyamine to produce a 12-branch second generation polyamidoamine dendrimer; and (e) reacting said 12-branch second generation polyamidoamine dendrimer with a polyisobutenyl succinimide acid anhydride to produce the product lubricant, a 12-polyisobutenyl succinicimide-12-polyamidoamine dendrimer polymer.

2. The process according to claim 1, wherein said first generation polyamidoamine dendrimer is reacted with a polyisobutenyl succinic acid anhydride to produce a 6-polyisobutenyl succinimide-6-polyamidoamine dendrimer polymer.

3. The process according to claim 1, wherein said alkyl acrylate contains from 1 to 6 carbons.

4. The process of claim 1 wherein said alkyl alcohol contains from 1 to 8 carbons.

5. The process according to claim 2, wherein the polyisobutenyl succinic acid anhydride has a molecular weight (Mn) ranging from about 500 to about 5000.

6. The process of claim 1, wherein said amine is selected from the group consisting of ethylene diamine, $NH_3$, diethylene-triamine, tetraethylene-triamine, tetraethylene-pentamine, pentalthylenehexamine, ethyleneamine and a polyamine.

7. An antioxidant/dispersant useful in a lubricant, of the formula:

m - polyisobutenyl-succinimide-n-polyamidoamine dendrimer polymer wherein m=1-1024 and n=4-1024.

8. The antioxidant/dispersant of claim 7, wherein m=6 and n=6.

9. The antioxidant/dispersant of claim 7, wherein m is 7.2 and n is 8.

10. The antioxidant/dispersant of claim 7, wherein m=12 and n=12.

11. The antioxidant/dispersant of claim 7, wherein m=24 and n=24.

12. The antioxidant/despersant of claim 7, wherein said dendrimer polymer has a molecular weight (Mn) ranging from about 2000 to about 500,000.

* * * * *